United States Patent Office 3,597,243
Patented Aug. 3, 1971

3,597,243
FLAME RETARDANT CELLULOSE ACETATE ARTICLES
Willard C. Brinegar, Charlotte, N.C., and Joseph Di Pietro, Alma, Mich., assignors to Celanese Corporation, New York, N.Y.
No Drawing. Continuation of application Ser. No. 538,968, Mar. 31, 1966. This application Aug. 25, 1969, Ser. No. 852,902
Int. Cl. C09d 5/18
U.S. Cl. 106—15                     10 Claims

ABSTRACT OF THE DISCLOSURE

A composition comprising cellulose acetate, a halogenated alkyl phosphate, a second additive selected from the group consisting of halogenated paraffins, dicumyl peroxide, di(t-butyl) peroxide, t-butyl-hydroperoxide, 2,5-dimethyl-2,5-di(t-butyl-5-peroxide) hexane, phenyl hydrazine, nitrobenzene, nitrosobenzene and 2,2′-azodiisobutyronitrile, and a third additive selected from the group consisting of diphenyl disulfides, phenyl phosphates and p-nitrosobenzoxy ethyl lactate.

---

This application is a continuation of application Ser. No. 538,968, filed Mar. 31, 1966 now abandoned.

This invention relates to improved flame retardant secondary cellulose acetate articles, and a process of producing them.

Secondary cellulose acetate has found wide commercial acceptance as man-made fibers for textiles, nonwoven products and the like. While these products are for the most part suitable in the end-use applications for which they are utilized, there are uses for which increased flame retardance would be very desirable. Such uses are wearing apparel and household furnishings, such as draperies, and upholstery fabrics.

It is an object of this invention to provide shaped articles of secondary cellulose acetate having increased flame retardance.

It is a further object of this invention to provide low denier fiber products of secondary cellulose acetate which do not support combustion when contacted with a flame after the flame is removed.

It is still a further object of this invention to impart the property of flame retardance to shaped articles of secondary cellulose acetate without serious sacrifice of their other favorable properties such as mechanical and dyeing properties.

In accordance with this invention, there is incorporated into an organic solvent solution of secondary cellulose acetate a minor amount of a halogenated alkyl phosphate selected from the group consisting of tris(beta-chloroethyl) phosphate, tris(dichloropropyl) phosphate and tris (2,3-dibromopropyl) phosphate and a minor amount of a second additive compound selected from the group consisting of halogenated paraffins, dicumyl peroxide, di(t-butyl) peroxide, t-butyl-hydroperoxide, 2,5-dimethyl-2,5-di(t-butyl-5-peroxy) hexane, phenyl hydrazine, nitrobenzene, nitrosobenzene and 2,2′-azodiisobutyronitrile.

The organic solvent solutions of secondary cellulose acetate to which this invention may be applied are conventional spinning or casting solutions for the production of filaments and films respectively which generally contain about 10 to 30 percent by weight of secondary cellulose acetate. The solvent used is preferably acetone but other solvents may be used such as methylene chloride, chloroform, and the like.

The halogen in the halogenated paraffin contemplated by this invention is preferably chlorine. However, a paraffin halogenated with other halogens such as bromine, fluorine, or iodine may also be used. The halogenated paraffin is composed of molecules having an average number of carbon atoms of at least six and is generally a liquid or wax at room temperature having a boiling point of at least 150° C., generally well above 200° C. at atmospheric pressure, a viscosity at 25° C. of at least 10 poises and a halogen content of about 30 to 70 percent by weight of the total halogenated paraffin. The halogenated paraffin may be, for example, a chlorinated paraffin wax or a chlorinated low molecular weight polyethylene.

The halogenated alkyl phosphate may be used in the solution of secondary cellulose acetate in an amount of about ½ to 7½, preferably in an amount of 1 to 5 percent by weight of the secondary cellulose acetate, whereas the second additive compound may be used in an amount of ½ to 7½, preferably ½ to 5 percent based on the weight of cellulose acetate.

The total amount of additives used is almost always less than the amount of halogenated alkyl phosphate or second additive compound which would be necessary to produce an equivalent fire-retardant effect in a shaped article, e.g., fiber or film of secondary cellulose acetate, when used along.

As is well known in the art, secondary cellulose acetate is a cellulose acetate containing about 54 to 56 percent of an acetyl group calculated as combined acetic acid. Thus, secondary cellulose acetate may be distinguished from cellulose triacetate which generally contains at least about 59 percent, preferably at least 61 percent, of acetyl groups calculated as combined acetic acid.

In addition to the flame retardant agents of this invention, the organic solvent solution of secondary cellulose acetate may contain other modifying components, e.g., pigments for dulling or coloring the yarn or film, plasticizers, stabilizers, etc.

The following examples further illustrate the invention:

EXAMPLE I

In a spinning solution in acetone of 26.9 weight percent of secondary cellulose acetate having an acetyl value of about 54.9% calculated as combined acetic acid were dissolved, 2½% based on the weight of cellulose acetate of tris(beta-chloroethyl) phosphate and 5% based on the weight of cellulose acetate of a chlorinated paraffin wax having a chlorine content of about 48 to 52% by weight, a viscosity at 25° C. of about 430 to 620 poises, a specific gravity at 25° C. of about 1.26, an atmospheric boiling point well above 300° C. and sold by the Hercules Powder Company under the trademark "Clorafin 50." To an identical spinning solution was added 10% tris(beta-chloroethyl) phosphate. The modified spinning solutions were extruded in a downward direction through a spinnerette containing 40 holes each 36 microns in diameter into a spinning column of 7 inches in diameter and 7 feet long containing air traveling in an upward direction. The temperature of the spinnerette face was 80° C. and the average air temperature in the spinning column was 50° C. The take-up speed of the resulting yarn was 100 meters per minute.

The resulting secondary cellulose acetate yarn had a total denier of 154, a tenacity of 1.24 grams per denier, and an elongation of 31.2 percent. The yarn containing both the tris(beta-chloroethyl) phosphate and the "Clorafin 50" was self-extinguishing when subjected to the flame test described below, whereas the yarns containing only the chlorinated phosphate burned when subjected to the same flame test.

EXAMPLE II

The procedure of Example I was repeated except that the tris(beta-chloroethyl) phosphate was used in an amount of 5% based on the weight of the cellulose acetate and the chlorinated paraffin wax was replaced by 2½% based on the weight of cellulose acetate of dicumyl peroxide.

The resulting yarn had a total denier of 158, a tenacity of 1.20 grams per denier, an elongation of 28.6% and was self-extinguishing when subjected to the flame test described below.

EXAMPLES III-XIII

The procedure of Example II was repeated except that the solutions contained 10% by weight of secondary cellulose acetate, types and amounts of halogenated alkyl phosphate and/or second additive compound shown in Table I, and instead of extruding the solution through the orifices of a spinnerette, it was cast into a film on a glass plate using a doctor blade 6⅛" long by 0.050" of clearance. The films were air dried at room temperature until no residual odor was noticeable.

When each of the films was subjected to the flame test described below, the films containing both additives (a) were found to be self-extinguishing, whereas films containing only one of the additives (b) burned.

TABLE I

Amount of additives based on weight of cellulose acetate plus additives

| Example | Halogenated alkyl phosphate | Second additive compound |
|---|---|---|
| III | (a) 1% tris(beta-chloroethyl) phosphate. (b) 1% tris(beta-chloroethyl) phosphate. | ½% dicumyl peroxide. |
| IV | (a) 1% tris(dichloropropyl) phosphate. (b) 1% tris(dichloropropyl) phosphate. | ½% dicumyl peroxide. |
| V | (a) 1% tris(beta-chloroethyl) phosphate. | ½% 2,5-dimethyl-2,5-di(t-butyl-5-peroxy) hexane. (b) 5% 2,5-dimethyl-2,5-di(t-butyl-5-peroxy) hexane. |
| VI | (a) 1% tris(dichloropropyl) phosphate. | ½% 2,5-dimethyl-2,5-di(t-butyl-5-peroxy) hexane. |
| VII | (a) 2% tris(dichloropropyl) phosphate. | 1% di(t-butyl) peroxide. (b) 5% di(t-butyl) peroxide. |
| VIII | (a) 1% tris(beta-chloroethyl) phosphate. | ½% di(t-butyl) peroxide. |
| IX | (a) 1% tris(2,3-dibromopropyl) phosphate. (b) 2% tris(2,3-dibromopropyl) phosphate. | ½% di(t-butyl) peroxide. |
| X | (a) 1% tris(2,3-dibromopropyl) phosphate. | ½% t-butyl hydroperoxide. (b) 5% t-butyl hydroperoxide. |
| XI | (a) 1% tris(beta-chloroethyl) phosphate. | ½% t-butyl hydroperoxide. |
| XII | (a) 1% tris(dichloropropyl) phosphate. | ½% t-butyl hydroperoxide. |
| XIII | (a) 2% tris(2,3-dibromopropyl) phosphate. | 1% phenyl hydrazine. (b) 10% phenyl hydrazine. |

EXAMPLES XIV-XVIII

The procedure of Examples III to XIII was repeated for various types and amounts of halogenated alkyl phosphates and/or second additive compound shown in Table II except that a doctor blade 6⅛ inch long by 0.020 inch of clearance was used in the casting step and the films were dried in a vacuum oven at 60° C., until free from solvents.

When each of the films was subjected to the flame test described below, the films containing both additives (a) were found to be self-extinguishing, whereas films containing only one of the additives (b and c) burned.

TABLE II

Amount of additives based on weight of cellulose acetate

| Example | Halogenated alkyl phosphate | Second additive compound |
|---|---|---|
| XIV | (a) 2% tris(beta-chloroethyl) phosphate. (b) 1% tris(beta-chloroethyl) phosphate. | 1% phenyl hydrazine. (c) 10% phenyl hydrazine. |
| XV | (a) 2% tris(dichloropropyl) phosphate. (b) 1% tris(dichloropropyl) phosphate. | 1% phenyl hydrazine. |
| XVI | (a) 5% tris(dichloropropyl) phosphate. | 1% nitrobenzene. (b) 10% nitrobenzene. |
| XVII | (a) 5% tris(dichloropropyl) phosphate. | 1% nitrosobenzene. (b) 10% nitrosobenzene. |
| XVIII | (a) 5% tris(dichloropropyl) phosphate. | 1% 2,2'-azodiisobutyronitrile. (b) 10% 2,2'-azodiisobutyronitrile. |

The "second additive compound" may actually be a mixture of the compounds contemplated under that designation. In many cases the use of three additives performs better than the use of two in the sense that a smaller total amount of additive is needed to produce a desired flame retardant effect then when only two additives are employed.

The following examples illustrate the use of a halogenated alkyl phosphate and two compounds from the group set out above as suitable second additive compounds.

EXAMPLE XIX

The procedure of Examples XIV to XVIII was followed except that the additives employed were 1% tris dibromo(2,3-dibromopropyl) phosphate, 3% "Clorafin 50" and 0.5% dicumyl peroxide, based on the weight of cellulose acetate.

The film obtained was self-extinguishing when subjected to the flame test described below.

EXAMPLE XX

The procedure of Examples XIV to XVIII was followed except that the additives employed were 1% tris-(dichloropropyl) phosphate, 2.5% "Clorafin 50" and 0.5% nitrosobenzene based on the weight of cellulose acetate.

A self-extinguishing film was obtained.

In addition to mixtures of compounds contemplated as the "second additive compound" a third additive compound may optionally be employed selected from the group consisting of diphenyl disulfide, phenyl phosphates and p-nitrosobenzoxy ethyl lactate. As is the case when a mixture of "second additive compounds" is employed, the use of a "third additive compound" exerts a synergistic effect, i.e., the total amount of additive employed to produce a desired fire-retardant effect is less than the total amount required when only a halogenated alkyl phosphate and a second additive compound are employed. The third additive compound may be employed in an amount of 0.25 to 1.5% based on the weight of cellulose acetate.

The following examples illustrate the use of a third additive compound.

EXAMPLE XXI

The procedure of Examples XIV to XVIII was followed except that the additives employed were 1% tris-(2,3-dibromopropyly) phosphate, 3% "Clorafin 50" and 0.5% diphenyl disulfide based on the weight of cellulose acetate. A self-extinguishing film was obtained when subjected to the flame test described below.

This procedure was repeated except that the additive was 10% diphenyl disulfide. This film burned when subjected to this flame test.

EXAMPLE XXII

The procedure of Example XXI was followed except that the diphenyl disulfide was replaced by 0.5% of o-phenyl dicresyl phosphate. A self-extinguishing film was obtained when subjected to the flame test described below.

This procedure was repeated except that the additive was 1% tris(2,3-dibromopropyl) phosphate and 4% o-phenyl dicresyl phosphate. This film burned when subjected to this flame test.

EXAMPLE XXIII

The procedure of Example XXI was followed except that the diphenyl disulfide was replaced by 0.5% of tri phenyl phosphate. A self-extinguishing film was obtained when subjected to the flame test described below.

This procedure was repeated except that the additive was 5% triphenyl phosphate. This film burned when subjected to this flame test.

EXAMPLE XXIV

The procedure of Example XXI was followed except thta the diphenyl disulfide was replaced by 0.5% of p-nitrobenzoxy ethyl lactate. A self-extinguishing film was obtained.

The flame test of the yarn product described in Examples I and II was carried out as follows:

The yarn was knitted into a hose leg, a six-to-eight inch section of which was suspended vertically from a support placed in an area essentially free from direct air drafts. The freely-hanging lower edge of the fabric was ignited with a luminous flame from either a Bunsen burner or a paper safety match. After the initial ignition of the fabric, the flame was removed and the burning characteristics of the fabric were observed. The sample was considered to be self-extinguishing if the flame was repeatedly extinguished after several ignitions of the same fabric sample.

In the test of the films of Examples III to XIII, three film samples about 6" by 1" in size where cut from the larger cast film and the samples were held vertically and ignited to the flame from a safety match. The sample was considered to be self-extinguishing if film appeared difficult to ignite and was repeatedly extinguished upon removal of the ignition source.

The flame test used for the film samples of Examples XIV to XXIV was as follows:

Three 1" by 4" strips of the film were held horizontally by means of tweezers and ignited with a luminous flame from a Bunsen burner. The sample was considered to be self-extinguishing if the film usually appeared difficult to ignite and the flame was repeatedly extinguished upon removal of the ignition source.

Although the foregoing disclosure of the invention primarily describes fibers and films as shaped articles, the compositions of the invention may also be used to form flame-retardant molded articles. Thus, the organic solvent solution of cellulose acetate and additives may be precipitated to form flake which may subsequently be injection- or compression-molded.

It is to be understood that the foregoing detailed description is given merely by way of illustration and that many variations may be made therein without departing from the spirit of our invention.

The embodiments of the invention in which an exclusive property or privilege is claimed are defined as follows:

1. A composition comprising secondary cellulose acetate, containing based on the weight of said cellulose acetate, from about ½ to 7½% of a halogenated alkyl phosphate selected from the group consisting of tris(beta-chloroethyl) phosphate, tris(dichloropropyl) phosphate, and tris(2,3-dibromopropyl) phosphate, from about ½ to 7½% of a second additive compound selected from the group consisting of halogenated paraffins composed of molecules having an average number of carbon atoms of at least six and having a boiling point of at least 150° C. at atmospheric pressure and a halogen content of from about 30% to about 70% by weight, dicumyl peroxide, di(t-butyl) peroxide, t-butyl hydroperoxide, 2,5-dimethyl-2,5-di (t-butyl-5-peroxy) hexane, phenyl hydrazine, nitrobenzene, nitrosobenzene, 2,2'-azodiisobutyronitrile and mixtures thereof and from about 0.25 to 1.5% of a third additive compound selected from the group consisting of diphenyl disulfides, phenyl phosphates and n-nitrosobenzoxy ethyl lactate.

2. The product of claim 1 wherein said halogenated alkyl phosphate is tris(beta-chloroethyl) phosphate and said second additive compound is a halogenated paraffin.

3. The product of claim 2 wherein said halogenated paraffin is chlorinated paraffin wax.

4. The product of claim 1 in which the third additive compound is diphenyl disulfide.

5. The product of claim 1 in which the third additive compound is a phenyl phosphate.

6. An organic solvent solution of secondary cellulose acetate suitable for forming into shaped articles containing base on the weight of said cellulose acetate from about ½ to 7½% of a halogenated alkyl phosphate selected from the groups consisting of tris(beta-chloroethyl) phosphate, tris(dichloropropyl) phosphate, and tris(2,3-dibromopropyl) phosphate, from about ½ to 7½% of a second additive compound selected from the group consisting of halogenated paraffins composed of molecules having an average number of carbon atoms of at least six and having a boiling point of at least 150° C. at atmospheric pressure and a halogen content of at least about 30% by weight, dicumyl peroxide, di(t-butyl) peroxide, t-butyl hydroperoxide, 2,5-dimethyl-2,5-di(t-butyl-5-peroxy) hexane, phenyl hydrazine, nitrobenzene, nitrosobenzene, 2,2'-azodiisobutyronitrile and from about 0.25 to 1.5% of a third additive compound selected from the group consisting of diphenyl sulfides, phenyl phosphates and p-nitrosobenzoxy ethyl lactate, and mixtures thereof.

7. The solution of claim 6 wherein the organic solvent is acetone, said halogenated alkyl phosphate is tris(beta-chloroethyl) phosphate and said second additive compound is chlorinated paraffin wax.

8. A shaped article formed from the composition of claim 1.

9. The product of claim 8 wherein said shaped article is a fiber.

10. The product of claim 8 wherein said shaped article is a film.

References Cited

UNITED STATES PATENTS

| | | | |
|---|---|---|---|
| 2,618,568 | 11/1952 | Meyer et al. | 106—177 |
| 2,669,521 | 2/1954 | Bierly | 106—15 |

MORRIS LIEBMAN, Primary Examiner

T. MORRIS, Assistant Examiner

U.S. Cl. X.R.

106—177; 252—8.1